June 27, 1933. E. P. SACREY 1,915,449
ELECTRIC MOTOR UNIT CONSTRUCTION FOR MOTOR DRIVEN TOOLS
Filed May 21, 1930
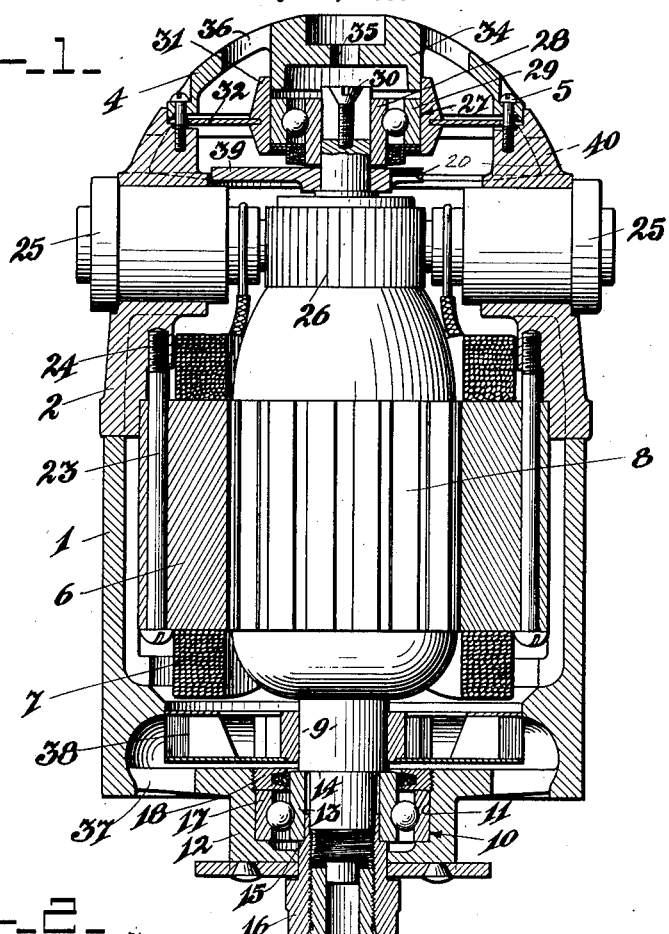
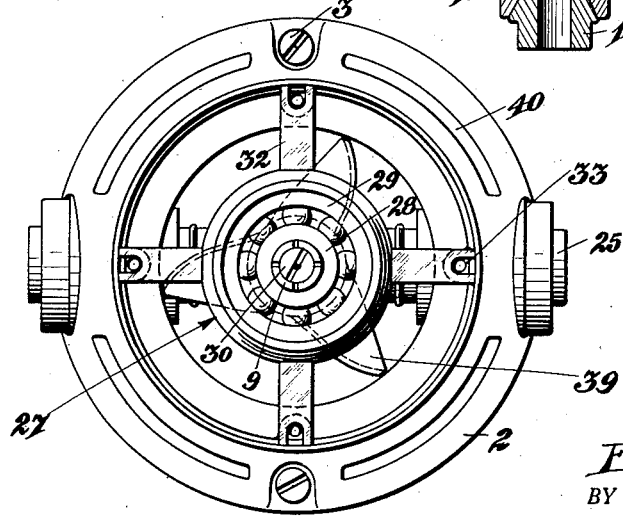
INVENTOR:
Elmer P. Sacrey,
BY Bodell & Thompson
ATTORNEYS.

Patented June 27, 1933

1,915,449

UNITED STATES PATENT OFFICE

ELMER P. SACREY, OF LIVERPOOL, NEW YORK

ELECTRIC MOTOR UNIT CONSTRUCTION FOR MOTOR DRIVEN TOOLS

Application filed May 21, 1930. Serial No. 454,211.

This invention relates to an electric motor unit for motor driven tools, as routers, shapers, drills, saws, abraders and the like, and has for its object, a particularly simple and efficient mounting for the motor shaft to compensate for vibration and for elongation of the shaft due to heating of the motor, and also, a particularly simple and efficient means for separating dust and solid particles from the current of air which cools the motor. Other objects will appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is a vertical sectional view of this motor unit.

Figure 2 is a plan view of parts seen in Figure 1, the cap of the casing being removed.

The motor casing is mounted in the frame of the implement, not shown, and as here shown, includes inner and outer sections 1, 2 separable in a direction axially of the motor and held assembled in any suitable manner as by screws 3. The outer section is provided with a removable cap 4 which is held assembled with the section 2 in any suitable manner as clamp members or screws 5.

6 designates the field magnets of the motor; 7 the field windings; 8 the armature or rotor, and 9 the shaft on which the armature is mounted. The shaft 9 is journalled at its opposite ends in bearings in the casing, the inner or lower end of the shaft being mounted in a bearing, and preferably an antifriction bearing 10, suitably mounted in a recess 11 formed in the head 12 at the inner or lower end of the section 1.

This bearing 10, as here shown, consists of inner and outer rings with antifriction members as balls between them, the inner ring 13 thrusting against the shoulder 14 on the shaft 9, a shoulder 15 on a collar 16 forming part of the thrusts against the ring 13. The collar 16 threads on the lower end of the shaft 9. The outer ring 17 is held in position by a plug 18 threading into the recess 11 against the upper end of the outer ring 17.

The tool holder or chuck in addition to the collar 16 includes a part 19 for receiving the shank of the tool, the part 19 threading into the collar 16.

The motor field is secured to the upper section of the casing by suitable means as screw bolts 23 extending through the field magnets and threading into holes at 24 in the section 2 of the casing.

25 designates the brushes which are detachably held in the section 2 and extend radially thereof and coact with the commutator 26 of the motor.

27 designates generally, the bearing for the upper or outer end of the rotor shaft 9, this being an antifriction bearing consisting of inner and outer rings 28 and 29 with balls between them, the shaft 9 extending into the inner ring and being held in snug engagement therewith by an expander 30. Preferably, the end of the rotor shaft 9 within the bearing 27 is split in order to be expansible, and the expander 30 is a screw threading axially into the split end of the shaft and having a conical head, which when the screw is tightened tends to expand the sections of the split end of the shaft outwardly into snug engagement with the bore of the ring 28.

The bearing 27 is mounted in a support capable of slight axial movement, and this support is yieldingly supported. The support as here shown, is a hub or collar 31 in which the bearing is mounted, the hub being located in the end of the casing at the end closed by the cap 4, it being supported by outwardly or radially extending spring means as arms 32, the outer ends of which are clamped between the abutting faces of the cap 4, and the section 2. The ends of the arm 32 are formed with notches 33 for receiving screws 5 which hold the cap 4 to the section 2.

The cap is preferably formed with means coacting with the hub 31 to form an oil seal around the bearing in the hub, or a container for oil. This means is shown as a projection or hub 34 extending from the cap axially into one end of the bore of the hub 31. The cap is provided with a work hole 35 through which the expander screw 30 is accessible, and through which the bearing is lubricated. The hub 31 is guided in its axial movement by the arms 32.

The casing or the cap 4 thereof is provided with ventilating or air inlet holes 36 and the head 12 at the inner or lower end is provided with ventilating or air outlet holes 37. A fan 38 is mounted on the shaft 9 adjacent the head 12 just above the bearing 10, and during the operation of the motor, the fan draws an air current through the casing to cool the motor and also to blow away the chips made by the tool. In order to prevent particles of dust and solid particles from accumulating in the motor, particularly in the air gap thereof, a separator is provided in the casing above the motor, this being a centrifugal element 39 mounted on the shaft 9 below the bearing 27. The separator has radially extending arms, the forward sides of which have a triangular groove 20 and are shaped as to eject any particles caught in the grooves by centrifugal force.

The casing is provided with outlet slots 40 through which any dust or solid particles are thrown by the separator 39.

The inner ring 29 of the bearing 27 is adjacent the separator 39.

After the motor is assembled in the casing and run long enough to heat up the shaft so that it elongates, the expander is tightened. This adjustment is intended to be permanent, and when the motor cools off, the shaft for the bearing and its hub 31 is capable of a slight inward movement. Also, during the operation of the motor when performing work, the vibration due to the tool performing its work is compensated for by the axial floating movement of the hub 31.

What I claim is:

1. In an electric motor unit for motor driven tools, the combination of a casing, including opposing separable sections, each having a bearing, an electric motor mounted in the casing and having the shaft of its rotor journalled in the bearings, a hub in which one of the bearings is mounted, and means resilient axially of the hub and rigid laterally of the hub supporting the hub in the casing to permit axial movement in opposite directions and holding the hub in axialy alignment and from sidewise movement.

2. In an electric motor unit construction for motor driven tools, the combination of a casing, alined bearings in the casing, an electric motor mounted in the casing and having the shaft of its rotor journalled in the bearings, one of the bearings having a slight axial movement and single means for both yieldingly supporting said axially movable bearing in the casing in a direction axial of the bearing and for rigidly supporting said bearing in a direction lateral of the bearing.

3. In an electric motor unit construction for motor driven tools, the combination of a casing, alined bearings in the casing, an electric motor mounted in the casing and having the shaft of its rotor journalled in the bearings, one of the bearings having a slight axial movement and means for yieldingly supporting said axially movable bearing in the casing in a direction axial of the bearing, said means comprising a hub in which the bearing is mounted, the hub being spaced apart from the walls of the casing and supporting means for the hub extending from the hub to the walls of the casing resilient in a direction axial of the hub and rigid in a direction lateral of the hub.

4. In an electric motor unit construction for motor driven tools, the combination of a casing, alined bearings in the casing, an electric motor mounted in the casing and having the shaft of its rotor journalled in the bearings, one of the bearings having a slight axial movement, and means for yieldingly supporting said axially movable bearing in the casing in a direction axial of the bearing, said means comprising a hub in which the bearing is mounted, the hub being spaced apart from the walls of the casing and outwardly extending arms extending from the hub and secured at their outer ends to the casing, said arms being resilient in a direction axial of the hub and rigid in a direction lateral of the hub.

5. In an electric motor unit construction for motor driven tools, the combination of a casing, alined bearings in the casings, an electric motor mounted in the casing and having the shaft of its rotor journalled in the bearings, one of the bearings having a slight axial movement, means for yieldingly supporting said axially movable bearing in the casing, said means comprising a hub in which the bearing is mounted, the hub being spaced apart from the walls of the casing and resilient supporting means extending from the hub to the walls of the casing, and means on the casing for forming an oil seal around the axially movable bearing.

6. In an electric motor unit construction for motor driven tools, the combination of a casing having bearings therein, an electric motor mounted in the casing and having the shaft of its rotor journalled in the bearings, a support for one of the bearings comprising a hub spaced apart from the walls of the casing, resilient supporting means between the hub and the wall of the casing whereby the hub and its bearing is capable of a slight axial movement, and the casing having means coacting with the hub to form an oil seal around the bearing support.

7. In an electric motor unit construction for motor driven tools, the combination of a casing having bearings therein, an electric motor mounted in the casing and having the shaft of its rotor journalled in the bearings, a support for one of the bearings comprising a hub spaced apart from the walls of the casing, resilient supporting means between the hub and the wall of the casing whereby the hub and its bearing is capable of a slight axial movement, the casing having a projection on the interior of the casing and extending into the bore of the hub.

8. In an electric motor unit construction for motor driven tools, the combination of a casing having a cap at one end, bearings in the casing, and an electric motor mounted in the casing and having the shaft of its rotor journalled in the bearings, one of the bearings being mounted in the casing at the end thereof at which the cap is located, a holder for the latter bearing, a removable support for the holder extending between the abutting faces of the cap and the casing, and means for detachably securing the cap in position.

9. In an electric motor unit construction for motor driven tools, the combination of a casing having a cap at one end, bearings in the casing, and an electric motor mounted in the casing and having the shaft of its rotor journalled in the bearings, one of the bearings being mounted in the casing at the end thereof at which the cap is located, a holder for the latter bearing and a support for the holder extending between the abutting faces of the cap and the casing, and means for detachably securing the cap in position, the holder being mounted to have a slight axial movement, and the cap having a projection coacting with the holder to form an oil seal for the holder and its bearing.

10. In an electric motor unit construction for motor driven tools, the combination of a casing having a cap at one end, bearings in the casing, and an electric motor mounted in the casing and having the shaft of its rotor journalled in the bearings, one of the bearings being mounted in the casing at the end thereof at which the cap is located, a hub in which the bearing adjacent the cap is mounted having an axial movement in opposite directions, means for resiliently supporting the hub and holding the hub in axial alignment and from sidewise movement extending from the hub and between the abutting faces of the cap and the casing, and means for securing the cap in position.

11. In an electric motor unit construction for motor driven tools, the combination of a casing having a cap at one end, bearings in the casing, and an electric motor mounted in the casing and having the shaft of its rotor journalled in the bearings, one of the bearings being mounted in the casing at the end thereof at which the cap is located, a hub in which the bearing adjacent the cap is mounted, means for resiliently supporting the hub extending from the hub and between the abutting faces of the cap and the casing, and means for securing the cap in position, the cap having a projection coacting with the hub to form an oil seal.

12. In an electric motor unit construction for motor driven tools, the combination of a casing having a cap at one end, bearings in the casing, and an electric motor mounted in the casing and having the shaft of its rotor journalled in the bearings, one of the bearings being mounted in the casing at the end thereof at which the cap is located, a hub in which the bearing adjacent the cap is mounted having an axial movement in opposite directions, resilient arms extending outwardly from the hub and held between the abutting faces of the cap and the casing, and means for securing the cap to the casing for holding the hub in axial alignment and from sidewise movement.

13. In an electric motor unit construction for motor driven tools, the combination of a casing having bearings at its inner and outer ends, an electric motor having the shaft of its rotor journalled in the bearings, the casing having vent openings at its opposite ends, a fan mounted in the motor shaft at the inner end of the casing for drawing air lengthwise of the motor through the vent openings at the outer end of the casing and for ejecting the air through the vent openings at the inner end of the casing, a centrifugal separator mounted on the motor shaft within the outer end of the casing, and the casing having outlet openings at its outer end through which the particles separated from the air by the separator are ejected.

14. In an electric motor unit construction for motor driven tools, the combination of a casing having bearings at its inner and outer ends, an electric motor having the shaft of its rotor journalled in the bearings, the casing having vent openings at its opposite ends, a fan mounted in the motor shaft at the inner end of the casing for drawing air lengthwise of the motor through the vent openings at the outer end of the casing and for ejecting the air through the vent openings at the inner end of the casing, a centrifugal separator mounted on the motor shaft within the outer end of the casing, and the casing having outlet openings at its outer end through which the particles separated from the air by the separator are ejected; the centrifugal separator including radially extending arms having a V-shaped groove in their leading edges.

In testimony whereof, I have hereunto signed my name, at Syracuse, in the county of Onondaga, and State of New York, this 9th day of May, 1930.

ELMER P. SACREY.